UNITED STATES PATENT OFFICE.

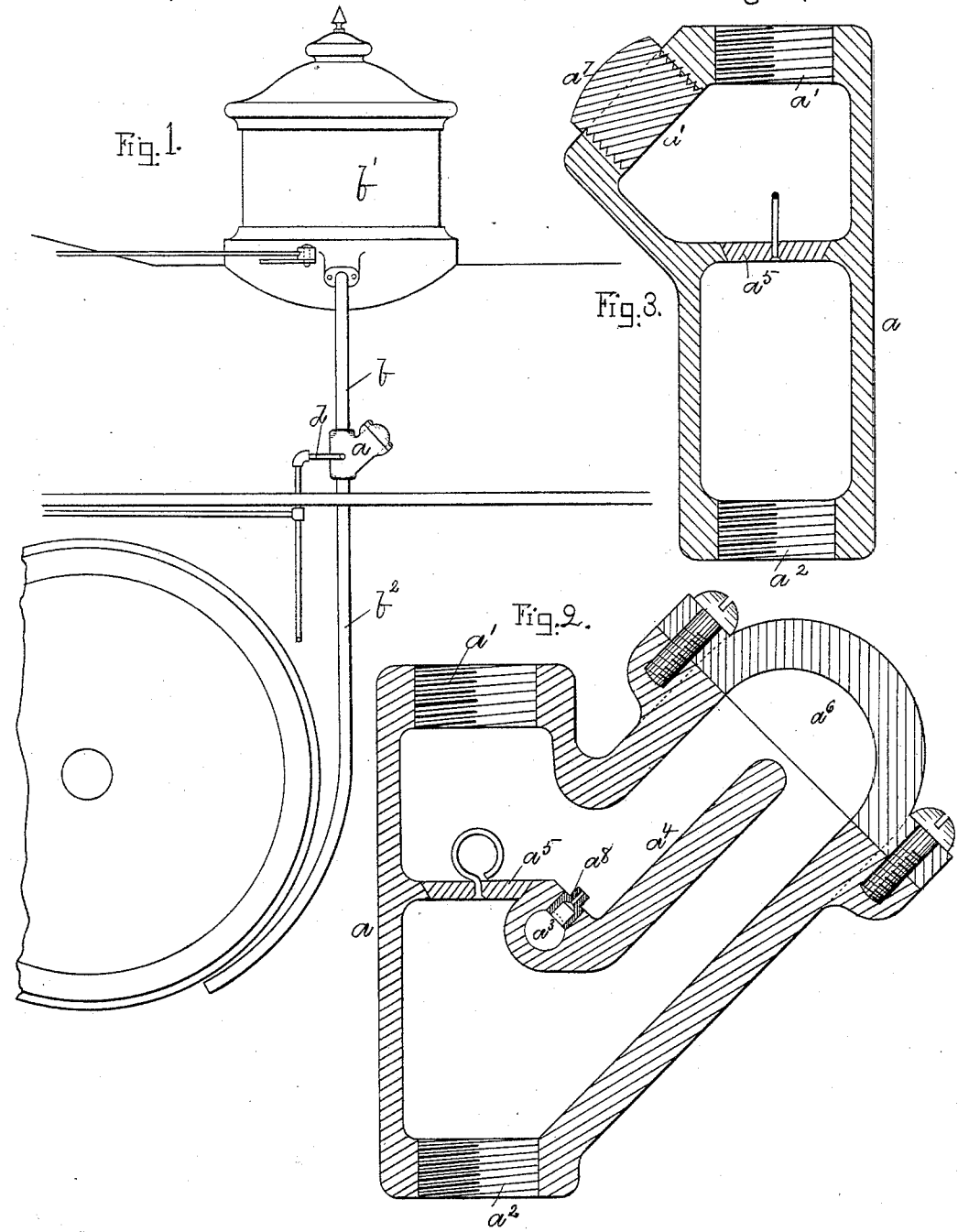

HENRY L. LEACH, JR., OF FITCHBURG, ASSIGNOR OF ONE-HALF TO HENRY L. LEACH, SR., OF BOSTON, MASSACHUSETTS.

TRACK-SANDING APPARATUS.

SPECIFICATION forming part of Letters Patent No. 433,686, dated August 5, 1890.

Application filed May 27, 1890. Serial No. 353,387. (No model.)

*To all whom it may concern:*

Be it known that I, HENRY L. LEACH, Jr., of Fitchburg, in the county of Worcester and State of Massachusetts, have invented a new and useful Improvement in Track-Sanding Apparatus, of which the following is a specification, reference being had to the accompanying drawings, in which—

Figure 1 shows a part of a locomotive provided with my apparatus. Fig. 2 is a sectional view of one form of trap. Fig. 3 is also a sectional view of the trap, but on a smaller scale.

The main feature of my invention is the combination of a sand-trap and blast leading into the trap.

In the drawings, which show the preferred form of my apparatus, $a$ is the trap; $a'$, an opening to receive a sand-pipe $b$ from the sand-box $b'$; $a^2$, an opening to receive the sand-delivery pipe $b^2$; $a^3$, an opening to receive the blast-pipe $d$. This form of my trap is formed with a partition $a^4$, which divides the trap into two chambers, as shown in Fig. 2, the sand falling from the sand-box into the upper chamber, whence it is blown by the blast over the partition, falling thence to the rails through the delivery-pipe $b^2$. It is desirable to provide a direct passage from one chamber to the other through which the sand may fall by gravity, if desired, without the use of the blast; and when my trap is formed with this passage a cover $a^5$ is provided to close the passage when it is not in use. It is highly desirable also to form the trap with that part of the trap which is opposite the blast removable, because this part is liable to be worn away by the sand-blast and needs to be occasionally replaced.

In the form of trap shown the removable part is a cap $a^6$. This removable part of the trap opposite the sand-blast is a feature of my invention. The main novelty of my invention consists, however, in the introduction of the blast into the trap. By this I am able to feed the sand to the sand-delivery pipe in small and even quantities—in as small quantities as desired and with regularity—thus making a material saving in the quantity of sand used and a consequent saving of power, rails, and wheels, as will be readily understood by all skilled in the art.

In the apparatus now in use there is no adequate provision for preventing the escape of an unnecessarily large quantity of sand and consequent blocking of the wheels, waste of power, and wear and tear of tires and rails. The blast is preferably compressed air, the use of which avoids dampening the sand and consequent clogging and freezing of the sand in cold weather.

My traps are usually provided with two openings $a'$, either of which receives the pipe from the sand-box, because in some styles of locomotives it is convenient to bring the pipe into the trap at an angle, while in other styles it is desirable to bring it straight into the trap. Only one opening is ordinarily used, however, the other being usually closed by a cap or plug $a^7$. (See Fig. 3.)

If desired, the cover $a^5$ may be removed by removing cap $a^6$ or $a^7$ and the sand allowed to fall straight through the trap by gravity, as already explained.

In practice I use a nozzle $a^8$ in the opening $a^3$, this nozzle having a bore about one thirty-second of an inch in diameter, and the blast is preferably introduced at the point shown, so as to lift or force the sand over the partition.

The operation will be readily understood by all skilled in the art without further description.

I am, so far as I know, the first to introduce a blast-nozzle into a trap and drive the sand thence to the delivery-pipe.

I am aware of Gresham's patent, No. 381,837, dated August 20, 1889, and disclaim all that is shown in it.

What I claim is—

1. In track-sanding apparatus, the combination of a trap and a blast-nozzle introduced into the trap, substantially as and for the purpose set forth.

2. In track-sanding apparatus, a trap into which a blast-nozzle is introduced, the trap having a removable part opposite the blast, substantially as and for the purpose set forth.

3. In track-sanding apparatus, a trap divided into chambers, the wall between which has an opening and cover, substantially as and for the purpose set forth.

4. A track-sanding apparatus formed with an interior partition forming connecting upper and lower chambers, an opening in the upper chamber, an opening in the other chamber, and a blast-nozzle at the bottom of the upper chamber, all substantially as and for the purpose set forth.

HENRY L. LEACH, JR.

Witnesses:
F. C. CURRIER,
C. Z. PARKER.